US010284035B2

(12) United States Patent
Bilteryst et al.

(10) Patent No.: US 10,284,035 B2
(45) Date of Patent: May 7, 2019

(54) ROTARY ELECTRICAL MACHINE COMPRISING SHAFT WITH STEPPED DIAMETERS, AND METHOD FOR ASSEMBLY OF THE MACHINE

(71) Applicant: VALEO EQUIPEMENTS ELECTRIQUES MOTEUR, Creteil (FR)

(72) Inventors: Pierre-Yves Bilteryst, Brimeux (FR); Henri Delianne, Maresville (FR); David Margueritte, Wailly Beaucamp (FR); Patrice Balthaze, Etaples sur Mer (FR); Eric Jozefowiez, Le Parcq (FR); Franck Mouret, Ecuires (FR); Sylvain Perreaut, Vieille-Eglise (FR); Hubert Debruyne, Trepied (FR)

(73) Assignee: Valeo Equipements Electriques Moteur, Creteil (FR)

( * ) Notice: Subject to any disclaimer, the term of this patent is extended or adjusted under 35 U.S.C. 154(b) by 237 days.

(21) Appl. No.: 15/255,340

(22) Filed: Sep. 2, 2016

(65) Prior Publication Data

US 2017/0070110 A1 Mar. 9, 2017

(30) Foreign Application Priority Data

Sep. 3, 2015 (FR) ...................................... 15 58155

(51) Int. Cl.
*H02K 1/28* (2006.01)
*H02K 15/02* (2006.01)
(Continued)

(52) U.S. Cl.
CPC ........... *H02K 1/2706* (2013.01); *H02K 1/243* (2013.01); *H02K 1/28* (2013.01); *H02K 15/022* (2013.01); *H02K 15/03* (2013.01)

(58) Field of Classification Search
CPC ........ H02K 1/243; H02K 1/28; H02K 15/022; H02K 1/226; H02K 1/24; H02K 1/27; H02K 15/03; H02K 15/16
(Continued)

(56) References Cited

U.S. PATENT DOCUMENTS 4,886,392 A * 12/1989 Iio ........................... B23P 11/00
29/525
5,789,832 A 8/1998 Hwang
(Continued)

FOREIGN PATENT DOCUMENTS

DE 19543541 A1 11/1996
FR 2745445 A1 8/1997
(Continued)

*Primary Examiner* — Thomas Truong
*Assistant Examiner* — Eric Johnson
(74) *Attorney, Agent, or Firm* — Berenato & White, LLC

(57) ABSTRACT

A rotary electrical machine comprising a front magnet wheel, a rear magnet wheel, and a shaft comprising four sections with respective diameters (D1, D2, D3, D4), distributed axially, wherein:
the first section comprises knurling which is configured such as to ensure radial retention between the shaft and the front magnet wheel;
the second section is configured to permit the indexing and centring of the front and rear magnet wheels;
the third section comprises knurling which is configured to ensure radial retention between the shaft and the rear magnet wheel; and
the fourth section comprises a collar which is configured to ensure the axial retention between the shaft and at least one magnet wheel,
and in that the diameters (D1, D2, D3, D4) of the shaft comply with the following equation:
$D1 < D2 < D3 < D4$.

19 Claims, 6 Drawing Sheets

(51) Int. Cl.
*H02K 1/27* (2006.01)
*H02K 15/03* (2006.01)
*H02K 1/24* (2006.01)

(58) Field of Classification Search
USPC .... 310/156.08, 156.09, 263, 156.66, 156.67,
310/156.68, 156.69, 156.71, 156.72,
310/156.73, 216.121, 216.123
See application file for complete search history.

(56) References Cited

U.S. PATENT DOCUMENTS

| | | | |
|---|---|---|---|
| 6,002,219 | A | 12/1999 | Permuy |
| 8,008,834 | B2 | 8/2011 | Gas et al. |
| 8,237,323 | B2 | 8/2012 | Badey et al. |
| 2008/0079330 | A1* | 4/2008 | Ishida .................. H02K 1/243 310/263 |
| 2008/0315714 | A1* | 12/2008 | Badey .................. H02K 1/243 310/261.1 |
| 2010/0013351 | A1* | 1/2010 | Gas ..................... H02K 1/28 310/263 |

FOREIGN PATENT DOCUMENTS

| | | |
|---|---|---|
| FR | 2905806 A1 | 3/2008 |
| WO | WO2006103361 A1 | 10/2006 |

\* cited by examiner

ROTARY ELECTRICAL MACHINE COMPRISING SHAFT WITH STEPPED DIAMETERS, AND METHOD FOR ASSEMBLY OF THE MACHINE

CROSS-REFERENCE TO RELATED APPLICATIONS AND CLAIM TO PRIORITY

This application is related to Patent Application No. 1558155 filed Sep. 3, 2015 in France, the disclosure of which is incorporated herein by reference and to which priority is claimed.

FIELD OF THE INVENTION

The present invention relates to a rotary electrical machine, and more specifically to a shaft and a claw rotor comprising two polar half cores. The present invention also relates to a method for fitting a shaft of this type.

The present invention has a particularly advantageous application in shafts which are assembled on magnet wheels with forged magnets.

BACKGROUND OF THE INVENTION

Many rotary electrical machines are equipped with a claw rotor. A machine of this type is described hereinafter in the form of a compact polyphase alternator, in particular for a motor vehicle. This alternator transforms mechanical energy into electrical energy, and can be reversible. A reversible alternator of this type is known as an alternator-starter, and in an another operating mode it transforms electrical energy into mechanical energy, in particular in order to start the thermal engine of the vehicle.

This machine substantially comprises a housing, and, inside the latter, a claw rotor which is integral in rotation with a shaft, and a stator which surrounds the rotor, with the presence of a slight air gap, and comprises a body in the form of a set of plates provided with notches equipped with notch insulators for fitting of the phases of the stator, each comprising at least one winding which forms a chignon on both sides of the stator body.

The windings are obtained for example from a continuous wire which is covered with enamel, or from conductive elements in the form of a bar, such as pins which are connected to one another for example by welding. These windings are for example three-phase windings which are connected in the form of a star or a triangle, the outputs of which are connected to at least one rectifier bridge comprising rectifier elements such as diodes or transistors of the MOSFET type, particularly when an alternator-starter is involved as described for example in document FR A2745445.

The claw rotor comprises two axially juxtaposed magnet wheels with an annular form, each of which has a transverse flange provided on its outer periphery, with teeth with a trapezoidal form facing axially towards the flange of the other magnet wheel, with the teeth of one magnet wheel penetrating into the space which exists between two adjacent teeth of the other magnet wheel, such that the teeth of the magnet wheels are imbricated.

The flanges of the wheels have an annular form, and have on their outer periphery radial projections which are connected by chamfers comprising teeth. These projections form claws together with the teeth. The number of teeth depends on the applications, and in particular on the number of phases of the stator.

A cylindrical core is interposed axially between the flanges of the wheels. This core supports an excitation winding on its outer periphery. An insulator, such as a winding support coil, is interposed radially between the core and the winding. The rotor shaft supports on its front end a drive unit, such as a pulley, belonging to a device for transmission of movement to at least one belt between the alternator and the thermal engine of the motor vehicle, and on its rear end with a reduced diameter it supports collector rings which are connected by wired connections to the ends of the excitation winding of the rotor.

Brushes belong to a brush-holder, and are arranged such as to rub on the collector rings. The brush-holder is connected to a voltage regulator. When the excitation winding is supplied electrically by the brushes, the rotor, which is made of ferromagnetic material, is magnetised, and becomes an inductor rotor with the formation of magnetic poles at the teeth of the magnet wheels.

This inductor rotor creates an induced alternating current in the induced stator, when the shaft is rotating, with the rectifier bridge(s) making it possible to transform the induced alternating current into a direct current, in particular in order to supply the loads and consumers of the on-board network of the motor vehicle, as well as to recharge the battery of the said vehicle.

The performance levels, i.e. the power and the output of the rotary electrical machine, can be increased further by using a certain number of permanent magnets, for example twelve or sixteen magnets, arranged symmetrically relative to the axis of the rotor, and interposed between two adjacent teeth on the inner periphery of the stator.

The permanent magnets can be inserted in the magnet wheels by crimping or forging. Crimping has the disadvantage of being a lengthy operation which prolongs the assembly of the shaft on the rotor. In fact, the crimping cycle time is substantial, and it can constitute a bottleneck in the production line. Insertion by forging for its part speeds up the assembly operations, but requires accurate centring of the shaft.

It is known in the prior art to use a shaft comprising grooves for an axial stop and straight knurling for a stop with rotation as described in document FR2905806. This type of shaft has the disadvantage of not ensuring centring of the magnet wheels relative to the shaft which is compatible with magnet wheels with forged magnets.

It is known in the prior art to use shafts comprising a centring area, but with no knurling for the purpose of retention in rotation of the magnet wheels, and no support or collar. These systems have the disadvantage of not guaranteeing satisfactory axial retention of the magnet wheels.

None of the present systems makes it possible to fulfil simultaneously all the requirements, i.e. of permitting the use of magnet wheels with forged slots, which requires accurate centring, and axial retention of the magnet wheels, combined with a reinforced clamping application which permits radial retention of the magnet wheels.

SUMMARY OF THE INVENTION

The objective of the invention is to eliminate some or all of these disadvantages.

For this purpose, according to a first aspect, the invention relates to a rotary electrical machine comprising a front magnet wheel, a rear magnet wheel, and a shaft comprising four sections with respective diameters $D1$, $D2$, $D3$, $D4$, distributed axially, wherein:

the first section comprises knurling which is configured such as to ensure radial retention between the shaft and the front magnet wheel;

the second section is configured to permit the indexing and centring of the front and rear magnet wheels;

the third section comprises knurling which is configured to ensure radial retention between the shaft and the rear magnet wheel; and the fourth section comprises a collar which is configured to ensure the axial retention between the shaft and at least one magnet wheel, and the diameters of the shaft comply with the following equation:

$$D1<D2<D3<D4.$$

By means of these arrangements, the shaft has areas which are dedicated to the centring, areas which are dedicated to the radial blocking, and a collar which permits axial blocking of the magnet wheels relative to the shaft. In other words, the first section with a diameter D1 makes possible a function of clamping on a first magnet wheel and stopping in rotation, the second section with a diameter D2 makes possible a function of centring on at least one magnet wheel, the third section with a diameter D3 makes possible a function of clamping on a second magnet wheel, and the fourth section with a diameter D4 makes possible an axial stop function.

In addition, the successive sections with a decreasing diameter make it possible to generate fewer constraints and deformations during the fitting, in comparison with the systems according to the prior art.

In particular, these arrangements permit centring which is compatible with the use of magnet wheels with magnets in forged slots.

In fact, rotors are used nowadays wherein the magnets are integrated by forging. In order to use rotors of this type, it is essential for the diameter within which the magnet wheels are contained to be perfectly coaxial with the shaft. Without the centring part, it would be complicated to align the rotor, and this would give rise to irregular magnet retention and poor resistance to torque.

The use of the shaft which is the subject of the invention will make it possible to use magnet wheels with forged slots, and thus to eliminate the crimping operation, consequently obtaining an assembly process which is simpler, faster and less costly.

These arrangements also permit reinforced clamping of the rotor, thanks to the collar which is present on the fourth section. During the assembly operation, the rear and front magnet wheels in particular, but also the other elements of the rotor, such as the pulley, the inner ring of the bearing and the ring, are forced in with local deformation of material. The collar makes it possible to apply a greater clamping force, and thus to obtain greater tension in the shaft.

According to some embodiments, the rear magnet wheel comprises:

a clamping area which is complementary to at least part of the first section; and a centring area which is complementary to at least part of the second section, and the front magnet wheel comprises:

a centring area which is complementary to at least part of the second section; and a clamping area which is complementary to at least part of the third section.

By means of these arrangements, at least one dimension of each section, in particular the length or the diameter, is in an area of at least one magnet wheel. These arrangements facilitate the assembly of the shaft and the magnet wheels.

According to some embodiments, the area of centring of the rear magnet wheel and the area of centring of the front magnet wheel have different lengths.

By means of these arrangements, the process of assembly of the shaft in the magnet wheels is simplified. In fact, when the shaft is fitted, these arrangements make it possible to make the knurled parts of the shaft enter the material of the magnet wheels, after having centred the wheels by means of the smooth part of the shaft. These arrangements are particularly advantageous if at least one of the two knurled parts has a long length.

According to some embodiments, the length of the rear magnet wheel is shorter than the sum of the lengths of the areas of centring of the front and rear magnet wheels.

According to some embodiments, only part of the knurling of the first section is covered by the front magnet wheel.

By means of these arrangements, the knurling of the first section is partly visible after assembly of the magnet wheels with the shaft. On this visible part of the knurling, it is possible to secure a ring by means of force fitting. These arrangements allow the knurling of the first section to block in rotation the front magnet wheel and the ring. The ring is an inserted ring on which the bearing will be supported.

According to some embodiments, the rotary electrical machine which is the subject of the invention comprises at least one so-called point-to-point knurled part in which the base of the successive protuberances which form the knurling are in contact with one another.

By means of these arrangements, the method for assembly of the shaft in the magnet wheels is easier to carry out. In fact, this type of knurling makes it necessary to apply less force during the assembly.

According to some embodiments, the rotary electrical machine which is the subject of the invention comprises at least one so-called spaced point knurled part, wherein the bases of two successive protuberances which form the knurling are separated from one another by a substantially flat surface.

By means of these arrangements, the flat surface between two successive teeth makes it possible to carry out more accurate centring of the magnet wheels during the fitting in the magnet wheels.

According to a second aspect, the present invention relates to a method for assembly of a rotary electrical machine which is the subject of the invention, comprising the following steps:

fitting of the shaft on the front and rear magnet wheels;

indexing of the areas of centring of the front and rear magnet wheels on the second section of the shaft;

clamping of the area of clamping of the rear magnet wheel on the first section of the shaft; and clamping of the clamping area of the front magnet wheel on the third section of the shaft; and abutment of the rear magnet wheel on the collar of the fourth section.

Since the objectives, advantages and particular characteristics of this method which is the subject of the present invention are similar to those of the rotary electrical machine which is the subject of the present invention, they will not be described again here.

BRIEF DESCRIPTION OF THE DRAWINGS

Other advantages, objectives and particular characteristics of the present invention will become apparent from the following non-limiting description of at least one particular embodiment of the devices and methods which are the subject of the present invention, in relation to the appended drawings, in which.

DETAILED DESCRIPTION OF THE PREFERRED EMBODIMENT(S)

The present description is provided by way of non-limiting example, with each characteristic of one embodiment advantageously being able to be combined with any other characteristic of any other embodiment.

It will be noted at this point that the figures are not to scale.

Figure 1:
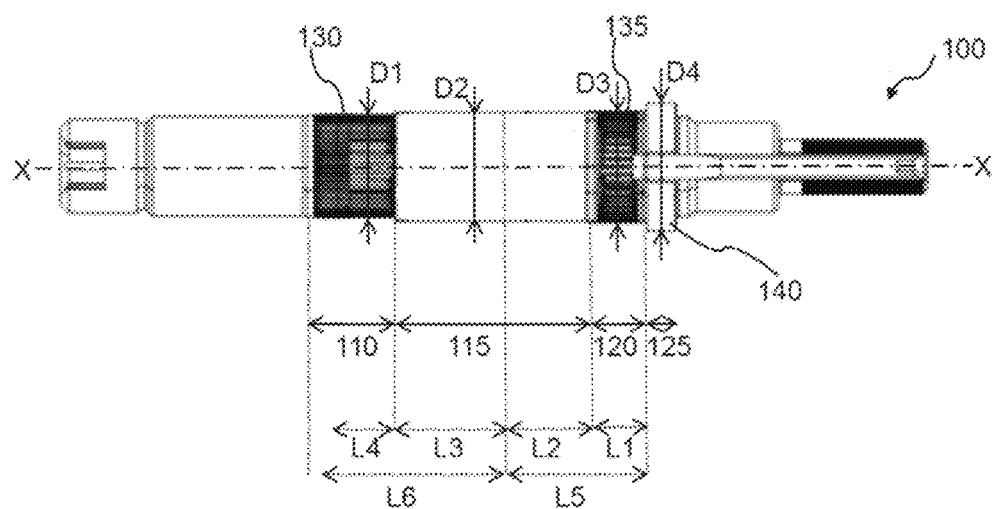
FIG. 1 represents, schematically and in cross-section, a particular embodiment of the shaft of the rotary electrical machine according to the invention.

FIG. 1 shows a particular embodiment of the shaft 100 of the rotary electrical machine 10 which is the subject of the invention.

According to some embodiments, the rotary electrical machine 10 comprises a front magnet wheel 230, a rear magnet wheel 205 and a shaft 100 comprising four sections: a first section 110 having a first diameter D1, a second section 115 having a second diameter D2, a third section 120 having a third diameter D3 and a fourth section 125 having a fourth diameter D3. The first, second, third and fourth sections 110, 115, 120, 125 of the shaft (100) are axially distributed, wherein:

the first section 110 comprises a knurled part 130 which is configured to ensure radial retention between the shaft 100 and the front magnet wheel 230;

the second section 115 is configured to permit the indexing and centering of the front and rear magnet wheels;

the third section 120 comprises a knurled part 135 which is configured to ensure radial retention between the shaft 100 and the rear magnet wheel 205; and the fourth section 125 comprises a collar 140 which is configured to ensure the axial retention between the shaft 100 and at least one magnet wheel 205, 230, and the diameters D1, D2, D3 and D4 of the shaft 100 comply with the following equation:

$$D1 < D2 < D3 < D4.$$

Figure 4:
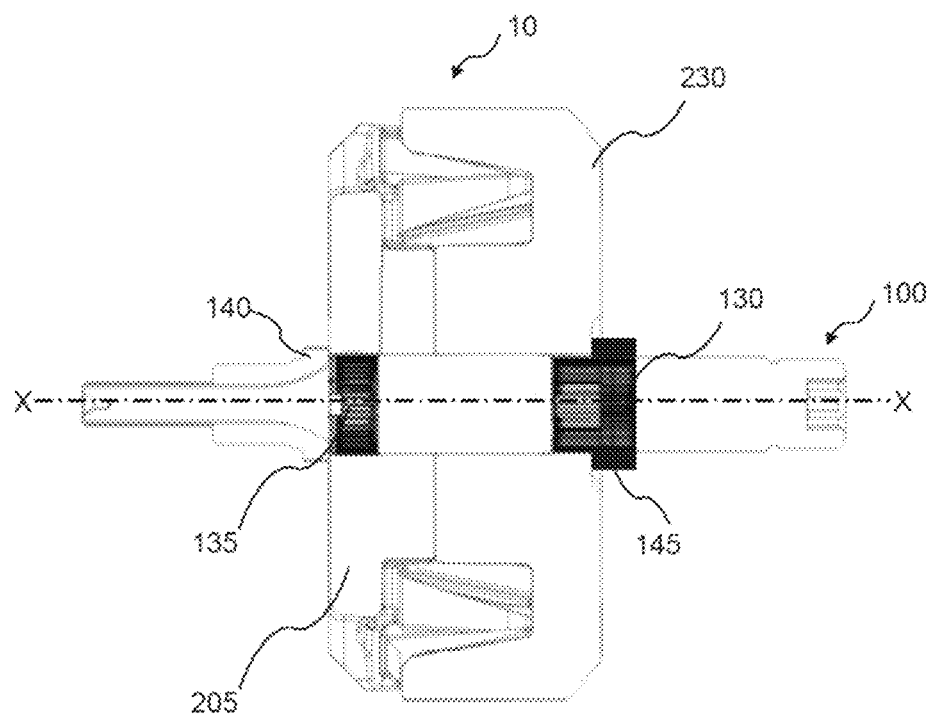
FIG. 4 represents, schematically, in perspective and in cross-section a particular embodiment of the shaft and of the magnet wheels of the rotary electrical machine which is the subject of the invention.

The shaft 100 is an elongate part with a round cross-section which is configured to be assembled with the other parts of the rotor such as, for example, the front 230 and rear 205 magnet wheels, the pulley (not represented), an inner ring of the bearing (not represented) and a ring which is represented by the reference 145 in FIG. 4. The shaft 100 constitutes a central part of the rotor which is integral in rotation with the front and rear magnet wheels. According to some embodiments, the shaft 100 is assembled with the other elements of the rotor by being forced fitted.

According to preferred embodiments, the order of insertion by force fitting of the shaft 100 with the other parts of the rotor is as follows: the inner ring of the bearing is supported on the ring 145, the ring is supported on the front magnet wheel 230, the front magnet wheel is supported on the rear magnet wheel 205, and the rear magnet wheel is supported on the collar 140 of the shaft 100.

According to preferred embodiments, the shaft 100 and the front and rear magnet wheels are parts which are made of steel. Preferably, the shaft 100 is a part comprising a steel which is harder than the steel of the front 230 and rear 205 magnet wheels, in order to facilitate the fitting of the shaft 100. Preferably, the front 230 and rear 205 magnet wheels comprise a mild steel with a low carbon content.

The shaft 100 comprises a first section 110 comprising a knurled part 130. According to some embodiments, the knurled part 130 consists of so-called point-to-point knurling or so-called spaced point knurling. The first section 110 has a diameter which is smaller than the sections 115, 120 and 125. According to preferred embodiments, at least one dimension of the first section 110 corresponds to at least one dimension of the front magnet wheel 230. The first section 110 is configured to be forced into a magnet wheel. Once assembled, the first section makes it possible to retain the front magnet wheel 230 in rotation relative to the shaft 100.

The shaft 100 comprises a second section 115, which is configured to permit the indexing and centring of the front and rear magnet wheels. According to preferred embodiments, the second section 115 is a part with a circular cross-section and a smooth surface. According to preferred embodiments, at least one dimension of the second section 115 is complementary to at least one dimension of at least one of the magnet wheels 205, 230. According to some embodiments, the length of the second section 115 is equal to the sum of the lengths of the guide areas 215 and 220 respectively of the front and rear magnet wheels. The second section 115 has a diameter smaller than the sections 120 and 125.

According to some embodiments, the second section 115 has a diameter D2 which is regular along its entire length.

According to some embodiments not represented, the second section 115 comprises two long parts with a diameter D2 which are separated by a short part with a diameter larger than D2. According to some embodiments, the short part has a diameter which is 0.01 mm (abbreviation for millimeter) larger than D1.

According to some embodiments not represented, the second section 115 comprises two distinct parts, i.e. a first part with a diameter D2 which is complementary to one of the two magnet wheels, and a second part with a diameter D2' which is complementary to the other magnet wheel. According to this embodiment, the diameters D1, D2, D2', D3 and D4 of the shaft 100 comply with the following equation:

$$D1 < D2 < D2' < D3 < D4.$$

The shaft 100 comprises a third section 120 comprising a knurled part 135. According to some embodiments, the knurled part 135 has so-called point-to-point knurling or so-called spaced point knurling. The third section 120 has a diameter smaller than the section 125. According to preferred embodiments, at least one dimension of the third section 120 corresponds to at least one dimension of the rear magnet wheel 205. The third section 120 is configured to be force fitted in a magnet wheel. Once assembled, the third section permits retention in rotation of the rear magnet wheel 205 relative to the shaft 100.

The shaft 100 comprises a fourth section 125, which comprises a collar 140 configured to ensure the axial retention between the shaft 100 and at least one magnet wheel 205, 230. The collar 140 is a sudden increase in the diameter of the shaft 100, constituting a shoulder which is configured to block at least one part which is force fitted on the shaft 100.

Figure 2:
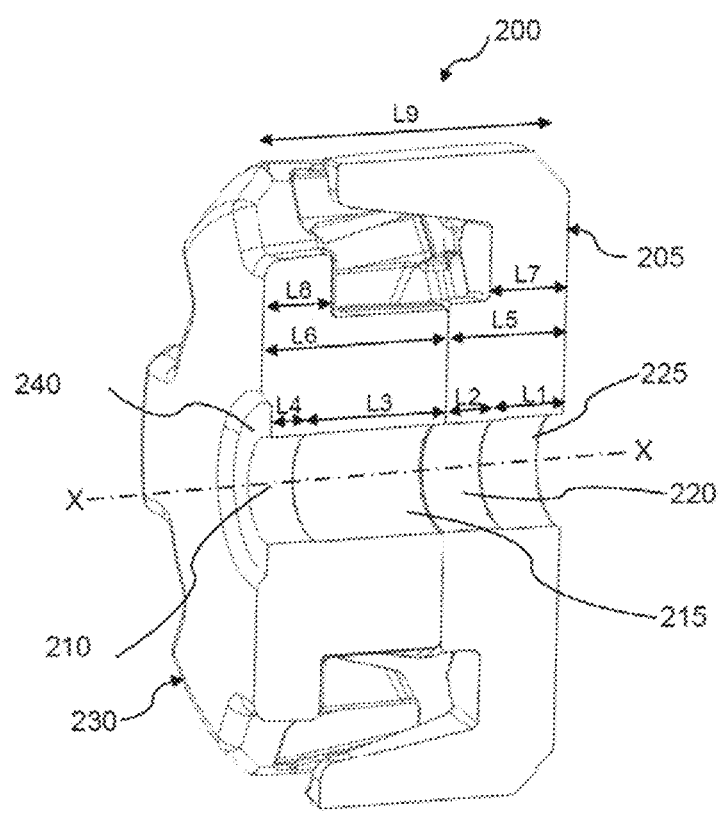
FIG. 2 represents schematically, in perspective and in cross-section, an embodiment of the two magnet wheels of the rotary electrical machine which is the subject of the invention.

FIG. 2 shows an embodiment of the two magnet wheels 205 and 230 of the rotary electrical machine 10 which is the subject of the invention. The electrical machine additionally comprises elements illustrated in FIG. 2, with a stator surrounding the two magnet wheels fitted on the shaft 100. For example, the rotary electrical machine additionally comprises the ring 145, the bearing and the pulley. The machine also comprises a housing which supports the said stator and the said bearing.

According to some embodiments, the rear magnet wheel 205 comprises:
 a complementary area 210 for clamping of at least part of the first section 110; and
 a complementary area 215 for centring at least part of the second section 115,
and the front magnet wheel 230 comprises:
 a complementary area 220 for centring of at least part of the second section 115; and
 a complementary area 225 for clamping at least part of the third section 120.

The rotary electrical machine 10 comprises two magnet wheels 205 and 230 which are axially juxtaposed and have an annular form, each with a transverse flange provided on its outer periphery with teeth with a trapezoidal form facing axially towards the flange of the other magnet wheel, with the tooth of one magnet wheel penetrating into the space which exists between two adjacent teeth of the other magnet wheel, such that the teeth of the magnet wheels are imbricated.

In its centre, the assembly of the two magnet wheels, which is also known as a set 200, comprises a tubular cavity which passes through the set from one side to the other, according to an axis X-X, and is configured to accommodate the shaft 100.

The front magnet wheel 230 comprises a clamping area 210 which is complementary to at least part of the first section 110. Preferably, the clamping area 210 and the first section 110 have lengths and diameters which are substantially the same. The length L4 is defined as the length of the clamping area 210 according to the axis X-X.

According to some embodiments, the length L4 is shorter than the axial length of the knurling 130.

The front magnet wheel 230 comprises a centring area 215 which is complementary to at least part of the second section 115. Preferably, the centring area 215 and the second section 115 have diameters which are substantially equal. The length L3 is defined as the length of the centring area 215 according to the axis X-X. According to preferred embodiments, the length L3 is strictly longer than 5 mm.

L6 is defined as the length of the front magnet wheel 230.

According to some embodiments, the length L6 is equal to the sum of the lengths L4 and L3.

Alternatively, the length L6 is slightly longer than the sum of the lengths L4 and L3. This is because of a setback 240 which can be seen in FIG. 2.

According to preferred embodiments, the length L4 is between 5% and 95% of the length of L6.

The rear magnet wheel 205 comprises a centring area 220 which is complementary to at least part of the second section 115. Preferably, the centring area 220 and the second section 115 have substantially equal diameters. The length L2 is defined as the length of the centring area 220 according to the axis X-X. According to preferred embodiments, the length L2 is strictly longer than 5 mm.

Preferably, the length of the second section 115 is equal to the sum of the lengths L1 and L2 of the centring areas 215 and 220.

The rear magnet wheel 205 comprises a clamping area 225 which is complementary to at least part of the third section 120. Preferably, the clamping area 225 and the third section 120 have lengths and diameters which are substantially equal. The length L1 is defined as the length of the clamping area 225 according to the axis X-X.

L5 is defined as the length of the rear magnet wheel 205. According to some embodiments, the length L5 is equal to the sum of the lengths L2 and L1.

Alternatively, the length L5 can be slightly longer than the sum of the lengths L2 and L1. This is the case in particular when the rear magnet wheel has a setback.

According to preferred embodiments, the length L1 is between 5% and 95% of the length of L5.

According to some embodiments, the centring area 215 of the rear magnet wheel 205 and the centring area 220 of the front magnet wheel 230 have different lengths. In other words, the front 230 and rear 205 magnet wheels are asymmetrical.

According to some embodiments, the length of the rear magnet wheel 205 is at least shorter than the sum of the lengths of the centring areas of the rear 215 and front 220 magnet wheels.

In other words, the dimensions of the set 200 comply with the following equation:

$$L5 < L2 + L3$$

This embodiment is particularly advantageous in the case when the front 230 and rear 205 magnet wheels are asymmetrical, and it makes it possible to obtain a minimal axial length of the two magnet wheels of L5+L6.

In fact, the selection of the axial length of L6 is more restricted. It is simpler to adjust the length L5. This is the case in particular because D2 is firstly fitted into the part with the axial length L5, whereas the length L6 must be such that L3 is longer than L4. However, during the introduction into the front magnet wheel, the knurled part 130 starts to be touched, without having touched the part 115 with the part with the length L3.

L7 is defined as the dimension of the base of the flange of the rear magnet wheel 205.

According to some embodiments, the dimension L7 is equal to L5, the length of the rear magnet wheel 205, such that the base of the flange occupies the entire dimension of the magnet wheel. These embodiments correspond in particular to the case in which the length of the core of the rear magnet wheel is substantially zero. In this case, the core is created as a whole by the front magnet wheel. In these embodiments, the length L2 of the centring area 215 is preferably longer than the length L1 of the clamping area 225.

L8 is defined as the dimension of the base of the flange of the front magnet wheel 230.

According to some embodiments, the dimension L8 is equal to L6, the length of the front magnet wheel 230, such that the base of the flange occupies all of the dimension of the magnet wheel. These embodiments correspond in particular to the case in which the length of the core of the front magnet wheel is substantially zero. In this case, the core is created as a whole by the rear magnet wheel. In these embodiments, the length L3 of the centring area 215 is preferably longer than the length L4 of the clamping area 210.

According to other embodiments, the two magnet wheels 205 and 230 are symmetrical. In other words, the lengths L6 and L5 are equal, the lengths of the clamping areas 210 and 220 are equal, and the lengths of the centring areas L2 and L3 are equal.

L9 defines the axial length of the set 200 consisting of the two magnet wheels. It is therefore equal to the sum of the lengths L5+L6.

Figure 3:
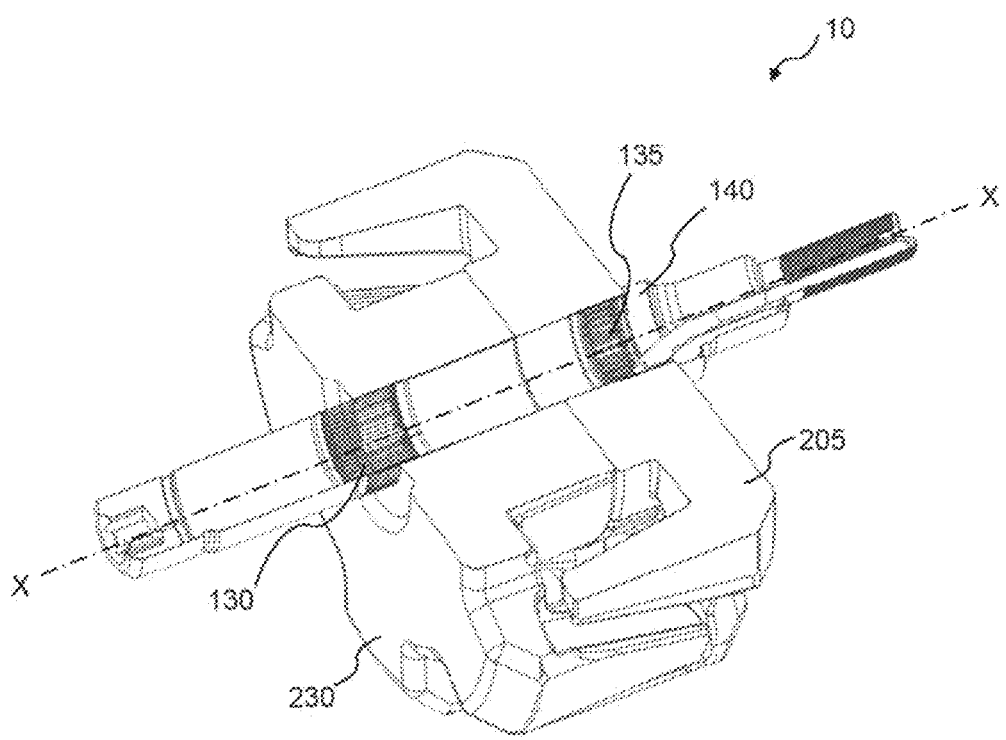
FIG. 3 represents, schematically, in perspective and in cross-section, a particular embodiment of the shaft and of the magnet wheels of the rotary electrical machine which is the subject of the invention.

FIG. 3 shows a particular embodiment of the shaft 100 and the magnet wheels 205 and 235 of the rotary electrical machine 10 which is the subject of the invention.

According to some embodiments, only a portion of the knurled part 130 of the first section 110 is covered by the front magnet wheel 230. In other words, a portion of the knurled part 130 can still be seen after the magnet wheels 205 and 230 have been fitted on the shaft 100. The portion of the knurled part 130 which projects is configured to be clamped by the ring represented by the reference 145 in FIG. 4.

According to some embodiments, the ring 145 is partly accommodated axially in the setback 240. This corresponds to what is illustrated in FIG. 4.

FIG. 4 shows a particular embodiment of the shaft and of the magnet wheels of the rotary electrical machine which is the subject of the invention.

Figure 5:
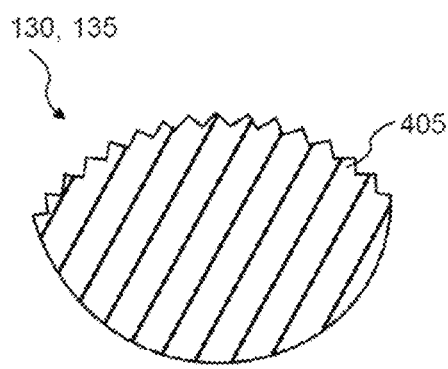
FIG. 5 represents schematically in cross-section a so-called point-to-point embodiment of at least one knurled part of the shaft of the rotary electrical machine which is the subject of the invention.
Figure 6:
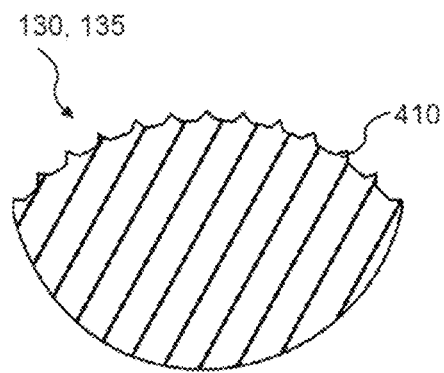
FIG. 6 represents schematically in cross-section, a so-called spaced point embodiment of at least one knurled part of the shaft of the rotary electrical machine which is the subject of the invention.

FIGS. 5 and 6 show two embodiments of the knurled parts 130 and 135. The knurled parts 130 and 135 comprise striations which are distributed regularly over all of the surface occupied by the knurling.

According to some embodiments, at least one knurled part is straight. A straight knurled part comprises striations which are parallel to one another, and oriented according to the axis X-X.

According to some embodiments, at least one knurled part is crossed. A crossed knurled part comprises two series of striations. The striations of the same series are perpendicular to one another. The striations of the first series have a non-zero angle relative to the striations of the second series, such that the two series of striations form crossings. According to some embodiments, the angle between the striations of the first series and the striations of the second series is 90°.

According to some embodiments, the clamping of the clamping areas 210, 225 respectively on the knurled parts 130, 135 is configured to ensure resistance to torque of the rear 205 or front 230 magnet wheel, of 150 Newton-meters.

According to some embodiments, the penetration of a knurled part 130, 135 into the material of a clamping area 225 or 210 is between 0.1 mm and 0.6 mm. These penetration values are adjusted according to the lengths of the knurled parts, such that the knurling is configured to ensure a predetermined resistance to torque. In order to ensure equivalent resistance to torque, less penetration will be necessary for a shorter length of knurling 130 or 135.

According to preferred embodiments, the penetration of at least one knurled part 130, 135 in the material of the clamping area 210, 225 is 0.4 mm.

According to some embodiments, the clamping of the clamping areas 210, 225 respectively on the knurled parts 130, 135 is configured to ensure resistance to torque of the rear magnet wheel 205, of 150 Newton-meters. According to some embodiments, the penetration of the knurled part 130, 135 is 0.4 mm. According to some embodiments, the penetration of the knurled part 130, 135 is 0.29 mm.

FIG. 5 shows a so-called point-to-point knurled part which comprises a plurality of protuberances forming striations. Each striation has a triangular form, and the base of each striation is in contact with the base of the two closest striations. According to some embodiments, the point which is formed by the projecting top of a striation has an angle of 90°.

According to some embodiments, the rotary electrical machine 10 which is the subject of the invention which comprises at least one so-called point-to-point knurled part 130, 135, wherein the bases of the successive protuberances 405 which form the knurled part are in contact with each other.

FIG. 6 shows part of a so-called spaced point knurled part which comprises a plurality of protuberances forming striations. Each striation has a triangular form, and the base of each striation is separated from the base of the two closest striations by a substantially flat surface. According to some embodiments, the point formed by the projecting top of a striation has an angle of 90°.

According to some embodiments, the rotary electrical machine 10 which is the subject of the invention comprises at least one so-called spaced point knurled part 110, 120, wherein the bases of two successive protuberances 410 which form the knurled part are separated from one another by a substantially flat surface.

Figure 7:
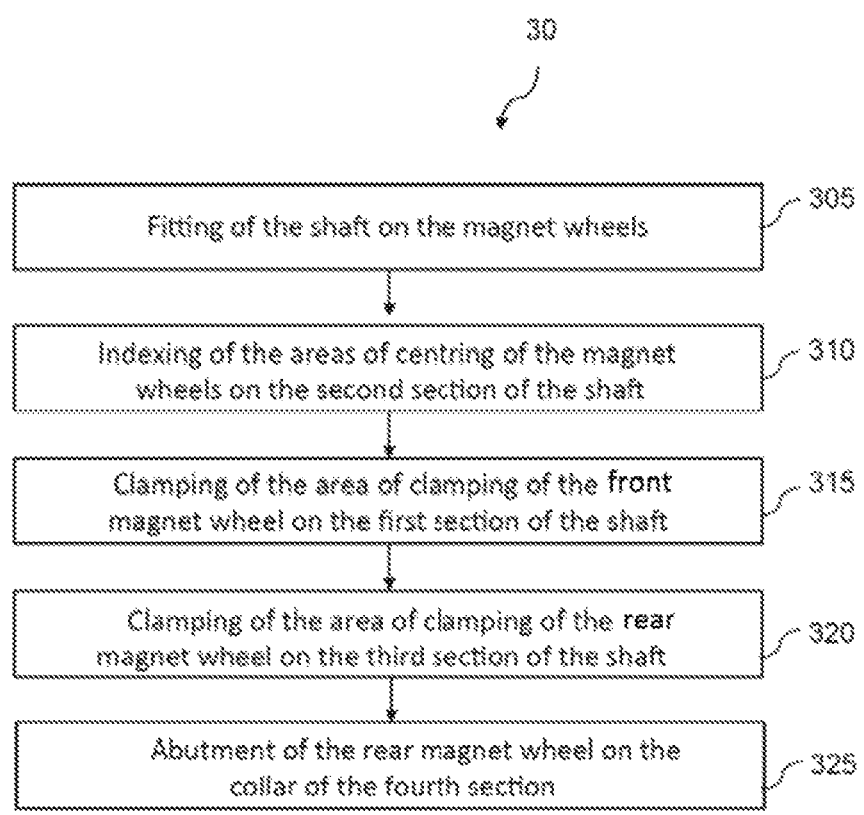
FIG. 7 represents in the form of a logic diagram a particular embodiment of the method for assembly of the rotary electrical machine which is the subject of the invention.

FIG. 7 shows a method 30 for assembly of a rotary electrical machine 10 which is the subject of the invention, comprising the following steps:
  fitting 305 the shaft 100 onto the front and rear magnet wheels 230, 205;
  indexing 310 the centering areas 215, 220 of the front and rear magnet wheels 230, 205 on the second section 115 of the shaft 110;
  clamping 315 the clamping area 210 of the front magnet wheel 230 on the first section 110 of the shaft 100;
  clamping 320 the clamping area 225 of the rear magnet wheel 205 on the third section 120 of the shaft 100; and
  forming abutment 325 of the rear magnet wheel 205 on the collar 140 of the fourth section 125.

The shaft 305 is for example forced fitted.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

The invention claimed is:

1. A rotary electrical machine (10), comprising:
   a front magnet wheel (230);
   a rear magnet wheel (205); and
   a shaft (100) including a first section (110) having a first diameter (D1), a second section (115) having a second diameter (D2), a third section (120) having a third diameter (D3) and a fourth section (125) having a fourth diameter (D4);
   the first, second, third and fourth sections (110, 115, 120, 125) of the shaft (100) are distributed axially, wherein:
      the first section (110) comprises a knurled part (130) configured to ensure radial retention between the shaft (100) and the front magnet wheel (230);
      the second section (115) comprises a smooth surface and is configured to permit the indexing and centering of the front and rear magnet wheels (230, 205);
      the third section (120) comprises a knurled part (135) configured to ensure radial retention between the shaft (100) and the rear magnet wheel (205); and
      the fourth section (125) comprises a collar (140) configured to ensure an axial retention between the shaft (100) and at least one of the front and rear magnet wheels (205, 230),
   and wherein the first, second, third and fourth diameters (D1, D2, D3, D4) of the shaft (100) comply with the following equation:

$$D1<D2<D3<D4.$$

2. The rotary electrical machine (10) according to claim 1, wherein the front magnet wheel (230) comprises:
   a clamping area (210) complementary to at least part of the first section (110); and
   a centering area (215) complementary to at least part of the second section (115),
   and wherein the rear magnet wheel (205) comprises:
   a centering area (220) complementary to at least part of the second section (115); and
   a clamping area (225) complementary to at least part of the third section (120).

3. The rotary electrical machine (10) according to claim 2, wherein the centering area (215) of the front magnet wheel (230) and the centering area (220) of the rear magnet wheel (205) have different lengths.

4. The rotary electrical machine (10) according to claim 3, wherein a length of the rear magnet wheel (205) is shorter than a sum of the lengths of the centering areas (220 and 215) of the rear and front magnet wheels (215 and 220).

5. The rotary electrical machine (10) according to claim 4, wherein at least one of the knurled parts (130, 135) includes point-to-point knurling, wherein bases of successive protuberances (405) which form the point-to-point knurling are in contact with one another.

6. The rotary electrical machine (10) according to claim 4, wherein at least one of the knurled parts (130, 135) includes spaced point knurling, wherein bases of two successive protuberances (410) which form the spaced point knurling are separated from one another by a substantially flat surface.

7. The rotary electrical machine (10) according to claim 3, wherein only a portion of the knurled part (130) of the first section (110) is covered by the front magnet wheel (230).

8. The rotary electrical machine (10) according to claim 3, wherein at least one of the knurled parts (130, 135) includes point-to-point knurling, wherein bases of successive protuberances (405) which form the point-to-point knurling are in contact with one another.

9. The rotary electrical machine (10) according to claim 3, wherein at least one of the knurled parts (130, 135) includes spaced point knurling, wherein bases of two successive protuberances (410) which form the spaced point knurling are separated from one another by a substantially flat surface.

10. A method (30) for assembly of the rotary electrical machine (10) according to claim 2, comprising the following steps:
   fitting (305) the shaft (100) on the front and rear magnet wheels (230, 205);
   indexing (310) the centering areas (215, 220) of the front and rear magnet wheels (230, 205) on the second section (115) of the shaft (100);
   clamping (315) the clamping area (210) of the front magnet wheel (230) on the first section (110) of the shaft (100); and
   clamping (320) the clamping area (225) of the rear magnet wheel (205) on the third section (120) of the shaft (100); and
   forming abutment (325) of the rear magnet wheel (205) on the collar (140) of the fourth section (125).

11. The rotary electrical machine (10) according to claim 2, wherein only a portion of the knurled part (130) of the first section (110) is covered by the front magnet wheel (230).

12. The rotary electrical machine (10) according to claim 2, wherein at least one of the knurled parts (130, 135) includes point-to-point knurling, wherein bases of successive protuberances (405) which form the point-to-point knurling are in contact with one another.

13. The rotary electrical machine (10) according to claim 2, wherein at least one of the knurled parts (130, 135) includes spaced point knurling, wherein bases of two successive protuberances (410) which form the spaced point knurling are separated from one another by a substantially flat surface.

14. The rotary electrical machine (10) according to claim 1, wherein only part of the knurled part (130) of the first section (110) is covered by the front magnet wheel (230).

15. The rotary electrical machine (10) according to claim 14, wherein at least one of the knurled parts (130, 135) includes point-to-point knurling, wherein bases of successive protuberances (405) which form the point-to-point knurling are in contact with one another.

16. The rotary electrical machine (10) according to claim 14, wherein at least one of the knurled parts (130, 135) includes spaced point knurling, wherein bases of two successive protuberances (410) which form the spaced point knurling are separated from one another by a substantially flat surface.

17. The rotary electrical machine (10) according to claim 1, wherein at least one of the knurled parts (130, 135) includes point-to-point knurling, wherein bases of successive protuberances (405) which form the point-to-point knurling are in contact with one another.

18. The rotary electrical machine (10) according to claim 17, wherein at least one of the knurled parts (130, 135) includes spaced point knurling, wherein bases of two successive protuberances (410) which form the spaced point knurling are separated from one another by a substantially flat surface.

19. The rotary electrical machine (10) according to claim 1, wherein at least one of the knurled parts (130, 135) includes spaced point knurling, wherein bases of two successive protuberances (410) which form the spaced point knurling are separated from one another by a substantially flat surface.

\* \* \* \* \*